US009096291B2

(12) United States Patent
Perosino et al.

(10) Patent No.: US 9,096,291 B2
(45) Date of Patent: Aug. 4, 2015

(54) STOWABLE BIMINI TOP

(75) Inventors: Gregory Perosino, Torrington, CT (US);
Joseph Hamilton, Sweetwater, TN (US);
Timothy Hamilton, Lenoir City, TN (US);
David Mazzarelli, Torrington, CT (US);
Nicholas Cegelka, Torrington, CA (US);
Michael Hissong, Torrington, CT (US);
Brian DeLisle, Barkhamsted, CT (US)

(73) Assignee: COMMERCIAL SEWING, INC., Torrington, CT (US)

( * ) Notice: Subject to any disclaimer, the term of this patent is extended or adjusted under 35 U.S.C. 154(b) by 155 days.

(21) Appl. No.: 13/611,696

(22) Filed: Sep. 12, 2012

(65) Prior Publication Data
US 2013/0239872 A1 Sep. 19, 2013

Related U.S. Application Data

(60) Provisional application No. 61/533,574, filed on Sep. 12, 2011, provisional application No. 61/665,701, filed on Jun. 28, 2012.

(51) Int. Cl.
*E04H 15/06* (2006.01)
*B63B 17/02* (2006.01)
*F16B 1/00* (2006.01)
*F16B 2/18* (2006.01)

(52) U.S. Cl.
CPC ............... *B63B 17/02* (2013.01); *E04H 15/06* (2013.01); *F16B 1/00* (2013.01); *F16B 2/185* (2013.01); *Y10T 403/32254* (2015.01)

(58) Field of Classification Search
CPC ........ E04H 15/06; B63B 17/02; B63B 17/023

USPC ............... 135/88.01; 248/534, 229.11, 228.2; 114/361
See application file for complete search history.

(56) References Cited

U.S. PATENT DOCUMENTS

| 2,823,684 | A | * | 2/1958 | Sartori ........................ 114/361 |
| 3,001,212 | A | * | 9/1961 | Towne ......................... 114/361 |
| 4,286,353 | A | | 9/1981 | Roche |
| 4,593,641 | A | * | 6/1986 | Adams et al. ................ 114/343 |
| 4,683,900 | A | * | 8/1987 | Carmichael ............... 135/88.01 |
| 4,926,782 | A | * | 5/1990 | Lacy ........................... 114/361 |
| 4,970,751 | A | | 11/1990 | Fisher et al. |
| 5,240,020 | A | * | 8/1993 | Byers ............................. 135/96 |
| 5,681,045 | A | | 10/1997 | Liao |
| 5,768,960 | A | | 6/1998 | Archuleta |
| 5,803,104 | A | * | 9/1998 | Pollen ............................ 135/96 |
| 5,918,613 | A | * | 7/1999 | Larson ....................... 135/88.01 |
| 6,142,438 | A | * | 11/2000 | Cooper et al. ................ 248/250 |

(Continued)

OTHER PUBLICATIONS

Non-Final Office Action dated Oct. 31, 2014 in U.S. Appl. No. 13/611,810.

*Primary Examiner* — Noah Chandler Hawk
(74) *Attorney, Agent, or Firm* — Cantor Colburn LLP

(57) ABSTRACT

Disclosed is a slide piece for a stowable bimini frame associable with a tower structure of a watercraft, the slide piece including a slide piece body portion, at least one frame association structure extending from the body portion, the at least one frame association structure being configured to slidingly associate the bimini frame with the slide piece body portion, and an affixing surface of the slide piece body portion, the affixing surface being positioned and configured for associating the slide piece body portion with the tower structure of the watercraft.

12 Claims, 6 Drawing Sheets

(56) References Cited

U.S. PATENT DOCUMENTS

| | | | |
|---|---|---|---|
| 6,216,317 B1 | 4/2001 | Chen | |
| 6,257,261 B1 | 7/2001 | Johnson | |
| 6,349,666 B1 * | 2/2002 | Hastings | 114/361 |
| 6,439,150 B1 * | 8/2002 | Murphy et al. | 114/361 |
| 6,478,500 B1 | 11/2002 | Farenholtz | |
| 6,711,783 B2 | 3/2004 | LeMole | |
| 6,799,529 B1 * | 10/2004 | Willis | 114/361 |
| 6,820,569 B2 * | 11/2004 | Warfel et al. | 114/361 |
| 6,907,642 B1 | 6/2005 | Czipri | |
| 6,928,766 B1 | 8/2005 | Goebel et al. | |
| 6,945,188 B2 * | 9/2005 | Eck et al. | 114/361 |
| 7,040,587 B2 * | 5/2006 | Thompson et al. | 248/214 |
| 7,401,569 B2 | 7/2008 | Jones | |
| 7,418,918 B2 * | 9/2008 | Bierbower et al. | 114/361 |
| 7,571,691 B2 * | 8/2009 | Russikoff | 114/361 |
| 7,685,960 B1 * | 3/2010 | Carusello et al. | 114/361 |
| 7,895,964 B2 * | 3/2011 | Russikoff | 114/361 |
| 7,950,342 B2 * | 5/2011 | Russikoff | 114/361 |
| 8,297,484 B2 * | 10/2012 | Jesewitz et al. | 224/406 |
| 8,597,245 B2 | 12/2013 | Jeter et al. | |
| 2006/0052670 A1 | 3/2006 | Stearns et al. | |
| 2008/0022916 A1 * | 1/2008 | Borges et al. | 114/361 |

* cited by examiner

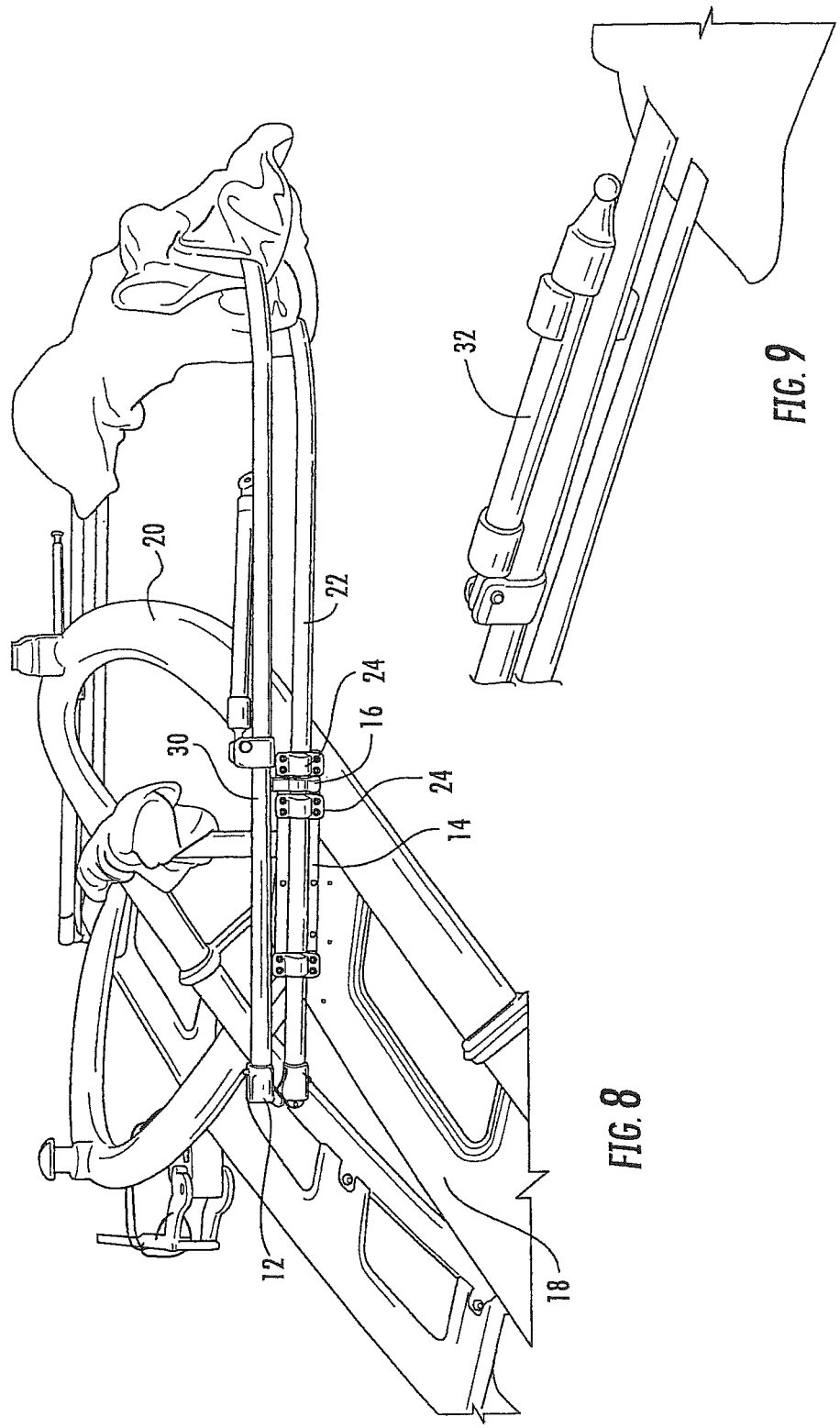

STOWABLE BIMINI TOP

CROSS-REFERENCE TO RELATED APPLICATIONS

This application is related to and claims the benefit of U.S. Provisional Patent Application Ser. No. 61/533,574 filed on Sep. 12, 2011 and U.S. Provisional Patent Application Ser. No. 61/665,701 filed on Jun. 28, 2012, the entire contents of which are herein incorporated by reference.

FIELD

The disclosure relates generally to a bimini top, and more particularly to a stowable bimini top.

BACKGROUND

Stowing a bimini top for a tower structure that is associable with a watercraft can be difficult and inefficient from a standpoint of both a time and storage space. Accordingly, a need exists in the art for a bimini top that can be easily and efficiently stowed.

SUMMARY

Disclosed is a slide piece for a stowable bimini frame associable with a tower structure of a watercraft, the slide piece including a slide piece body portion, at least one frame association structure extending from the body portion, the at least one frame association structure being configured to slidingly associate the bimini frame with the slide piece body portion, and an affixing surface of the slide piece body portion, the affixing surface being positioned and configured for associating the slide piece body portion with the tower structure of the watercraft.

Also disclosed is a stowable bimini frame associable with a tower structure of a watercraft, the bimini frame including a first frame portion, a second frame portion, a hinge associating the first portion and the second portion, the second portion being foldable in a direction of the first portion via rotation about the hinge, a slide piece in sliding association with the first frame portion via at least one frame association structure extending from the slide piece, and an affixing surface of the slide piece, the affixing surface being positioned and configured for associating the slide piece with the tower structure of the watercraft.

Further disclosed is a bimini top system for a watercraft, the system including a tower structure extending the watercraft, a stowable frame including a first frame portion and a second frame portion a hinge associating the first portion and the second portion, the second portion being foldable in a direction of the first portion via rotation about the hinge, and a slide piece affixed to the tower structure and in sliding association with the first frame portion via at least one frame association structure extending from the slide piece, wherein the sliding association allows the stowable frame to be configured between an openable position extended relatively away from the tower structure and a stowable position disposed in relative proximity to the tower structure via a sliding of the stowable frame relative to the slide piece and the tower structure to which the slide piece is affixed.

BRIEF DESCRIPTION OF THE FIGURES

FIGS. 3-9 are various partial and full perspective views of a bimini top shown in positions intermediate to the open position shown in FIG. 1 and a stowed position;

DETAILED DESCRIPTION

Figure 1:
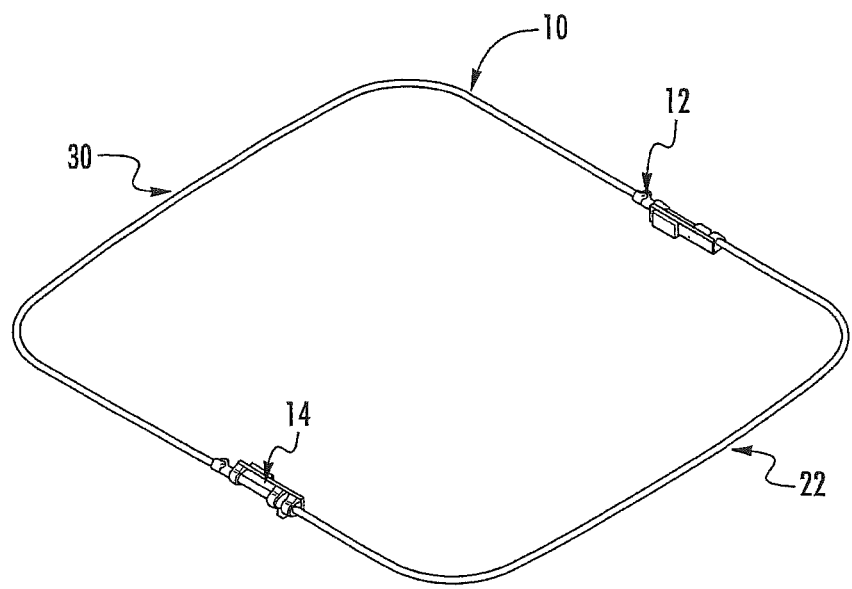
FIG. 1 is a perspective view of schematic bimini frame in an open position.
Figure 2:
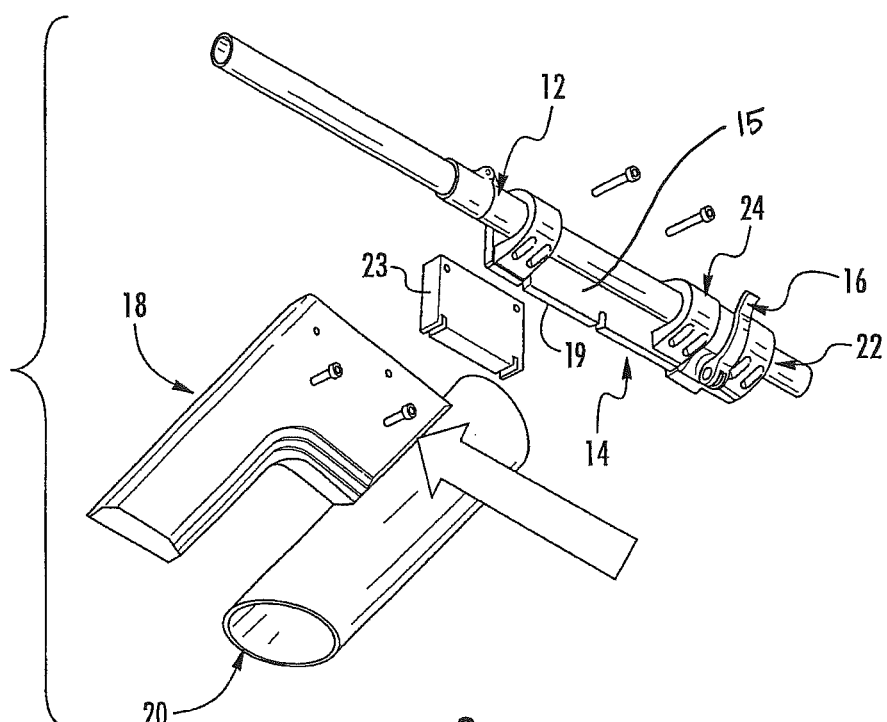
FIG. 2 is a schematic partial and exploded view of a hinge and slide area of the frame shown in FIG. 1, as well as a portion of a tower structure of a watercraft.

FIG. 1 illustrates an exemplary embodiment of a bimini frame 10 that may fold and slide in a manner that allows a bimini top to be stowed against a tower/arch type structures mounted on any desirable style of watercraft (such as but not limited to a sport, ski, wakeboard, fishing, or other watercraft). As is best shown in FIG. 2, the frame 10 includes a hinge 12, slide piece 14, and cam locking device 16. These elements of the frame 10 allow the frame 10 to fold, slide, and lock in the manner alluded to above and discussed in greater detail below. Along with the frame 10, these elements may be made of any desirable material, such as but not limited to various metals and hard plastics. The frame 10 and/or tower 20 are also typically equipped with a cover portion 17 (such as but not limited to canvas, plastic, etc.) stretching around and across the bars of the frame 10 and secured via affixing mechanisms such as but not limited to Velcro, snaps, and ties.

As shown in the exemplary embodiment of FIG. 2, the slide piece 14 includes a slide piece body portion 15, which may be affixed to a handle 18 of a boat tower structure 20 at affixing surface 19 via any association means such as but not limited to mechanical fasteners 21. In the exemplary embodiment of FIG. 2, the body portion 15 is not directly affixed to the handle portion 18, as spacer 23 is disposed between the affixable surfaces of the handle 18 and the slide piece 14 to create clearance therebetween. Of course, embodiments wherein the surface 19 is directly affixed to the handle 18 and embodiments wherein some or all of the handle 18, slide piece 14, and/or spacer 23 elements are of unitary construction with each other are also contemplated.

Figure 3:
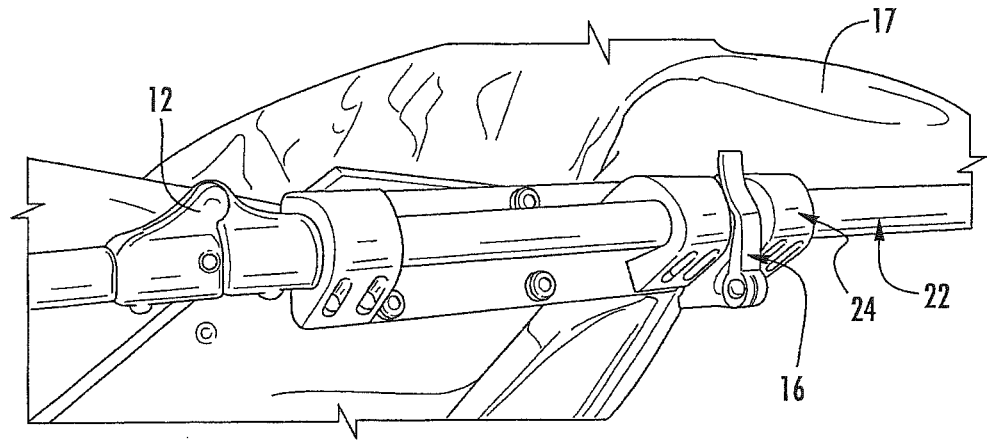

As shown in FIG. 1, the frame 10 includes a relatively front portion 22 and a relatively rear portion 30. The front portion 22 of the frame 10 is associated with the slide piece 14 via frame association structures or slide parts 24. These slide parts 24 may be affixed to the body 15 of the slide piece 14 via any association means such as but not limited to mechanical fasteners, welding, and unitary construction. In use, slide part portion of the piece 14 may be covered with a protective cover of similar material to the piece 14. When in the open position shown in FIGS. 1 and 3, the cams 16 are locked so as to prevent the front portion 22 (and frame 10 in general) from sliding relative to the slide piece 14 and the tower structure 20 to which the slide piece 14 is affixed. The front portion 22 and back portion 30 of the frame may also be locked in this open position at the hinge 12.

Figure 4:
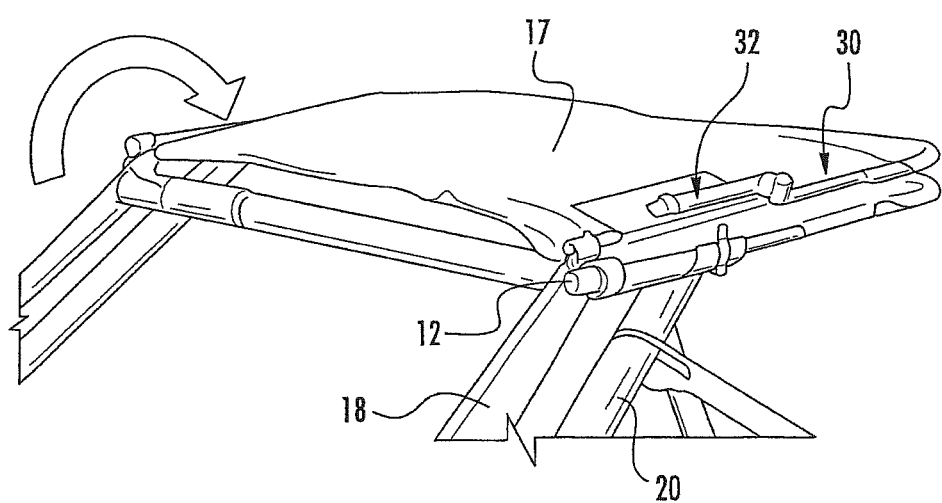
Figure 5:
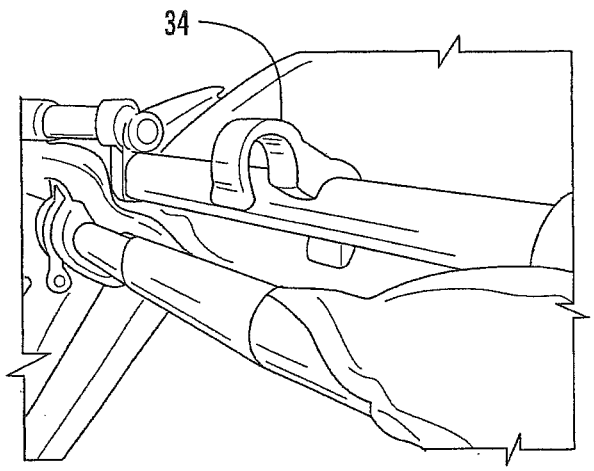
Figure 6:
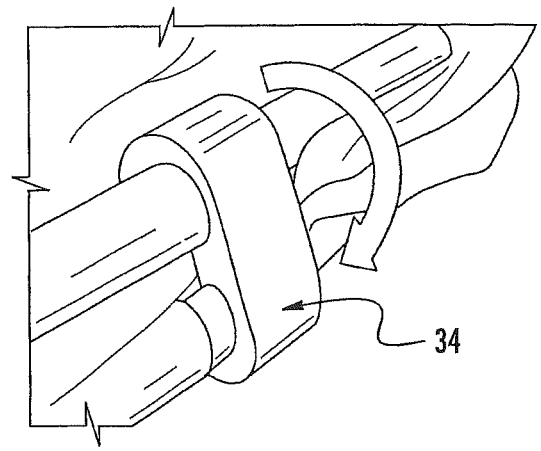
Figure 7:
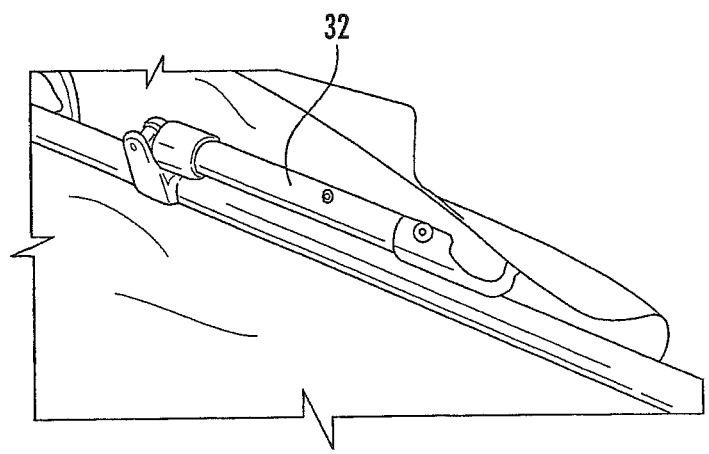

As is best shown in FIG. 4, which illustrates an upper portion of a bimini top system 8 (including the frame 10 and a portion of the tower structure 20 mounted on a watercraft), the back portion 30 of the frame 10 may be moved towards a folded (and eventually stowed) position by folding the frame 10 at hinge 12. This is achieved by disengaging rear legs 32 from the tower structure 20 and folding the back portion 30 of the frame 10 (which is fully locked against sliding in a forward position by the cams 16) upwards and onto the front portion 22. As is best shown in FIGS. 5-7, the front and back portions of the frame 10 may then be clipped together via clips 34, and the back legs 32 may be stored under Velcro flaps.

Figure 10:
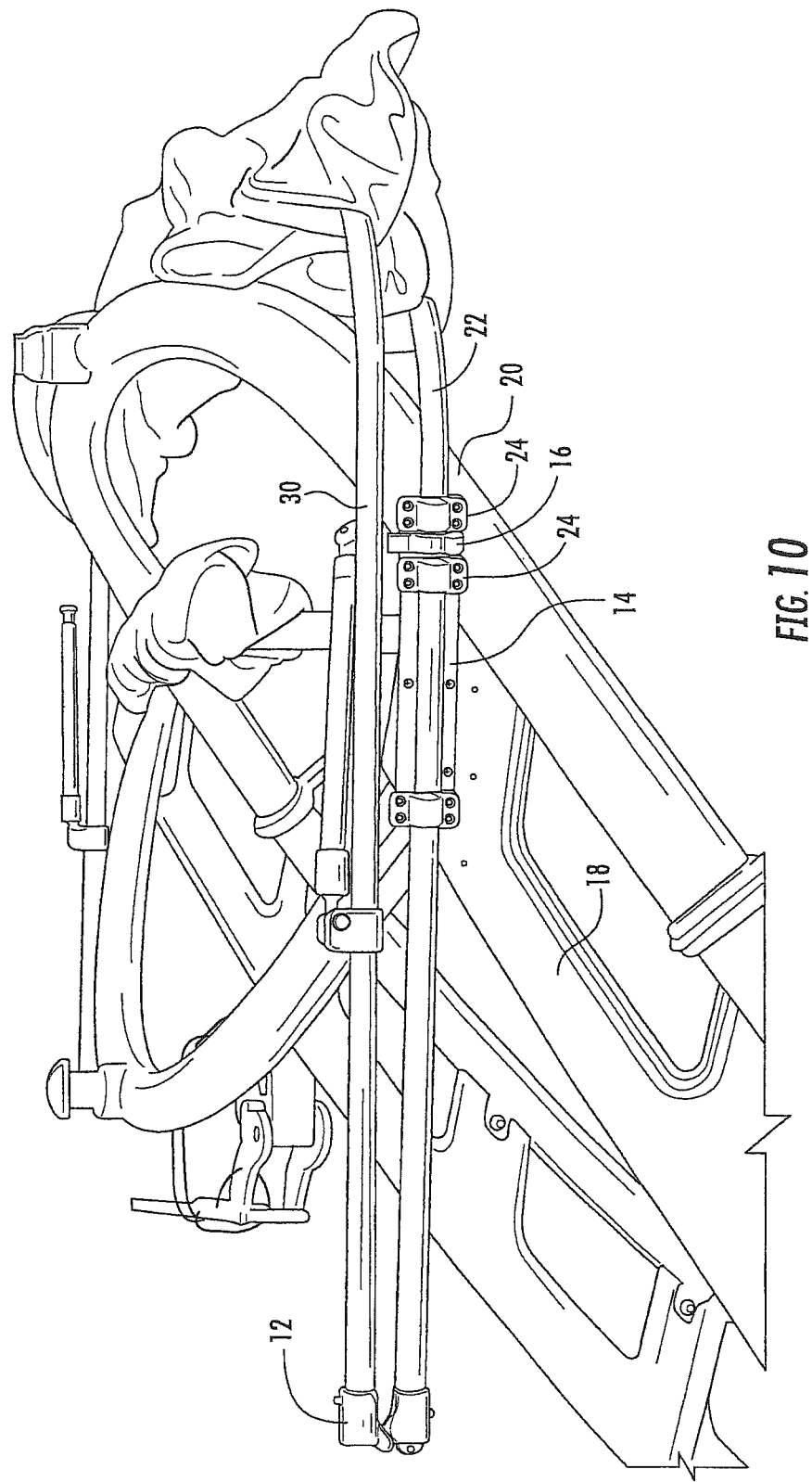
FIG. 10 is a perspective view of a bimini in a stowed position.

Referring now to FIGS. 8-10, the fully folded frame 10 (which remains locked against sliding via cams 16 in FIG. 8 is positioned for sliding into the stowed position. This stowed position is shown in FIG. 10, wherein the folded front and back portions of the frame 10 are slid backwards from the folded position of FIG. 9 to the stowed position. This sliding occurs by first unlocking the cams 16, and then sliding the front portion 22 of the frame 20 backwards through the slide parts 24. As the slide parts 24 are in a fixed position relative to the tower structure 20 (via the affixing of the slide piece 14 to the tower 20), the sliding of the front portion 22 moves the frame 10 backward relative to the tower structure 20, and into the folded, slid, and stowed position shown in FIG. 10. The cams 16 are then again locked to prevent the frame 10 from sliding out of the stowed position.

Figure 11:
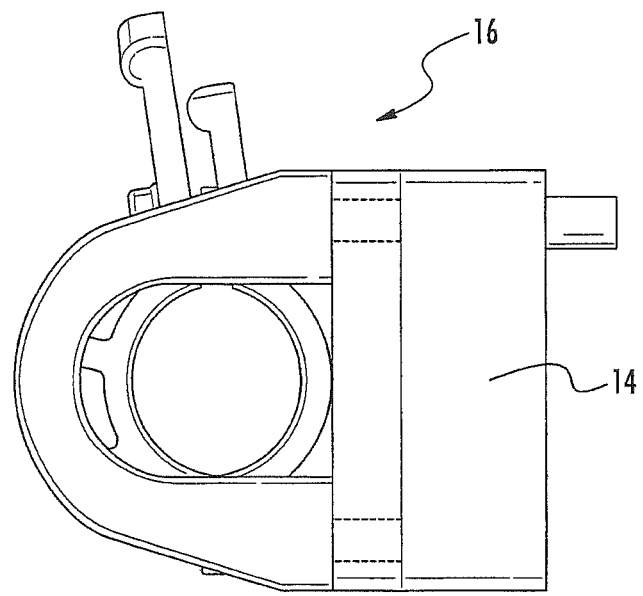
FIG. 11 is an enlarged end view of the slide piece shown in FIG. 1 as configured in a first, unlocked configuration.
Figure 12:
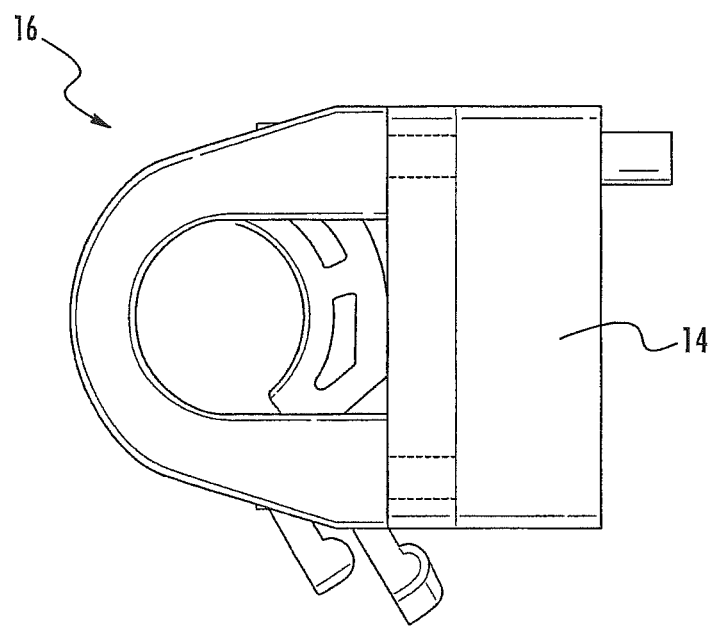
FIG. 12 is an enlarged end view of the slide piece shown in FIG. 1 as configured in a second, locked configuration

Referring now to FIGS. 11 and 12, an exemplary embodiment of the slide piece 14 and cam 16 is shown. In FIG. 11 the slide piece 14 and cam 16 are shown in an unlocked configuration. When in this unlocked configuration, a clearance is present between the front portion 22 of the frame and the innermost walls of the slide piece 14. In an exemplary embodiment, this clearance is at least 3/8 of an inch on either lateral side of the frame bar.

In FIG. 12 the slide piece 14 and cam 16 are shown in a locked configuration. When in this locked configuration, the cam 16 is positioned in a manner that biases the frame bar towards and into contact with one of the walls (the wall away from slide piece connection with the handle 18 in the embodiment of FIG. 12), causing the bar to traverse and close the clearance that is present on one side of the bar when in the open position of FIG. 11. The bias caused by the above discussed locking (or any other desirable locking mechanism) is designed to hold the frame 10 in position while traveling at any acceptable speeds of highway or water transportation.

While the front and back portions of the frame 10 are shown to be "U" shaped in the exemplary embodiment of FIG. 1, it should be appreciated that the frame may include any shape conducive to use with any known tower configuration. In addition, though the sliding of the frame 10 is shown to occur through the slide parts 24 in the exemplary embodiments of FIGS. 2-10, it should be appreciated that this sliding may occur via any known mechanical mechanism, such as but not limited to telescoping portions and additional hinges.

It should be noted that though portions 20, 30 of the frame 10 are referred to as "front" and "back" respectively, these qualifiers are merely provided for descriptive purposes. In fact, the portions may be positioned in any desirable orientation relative to a front or back of a watercraft on which the frame is mounted.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A stowable bimini top associable with a tower structure of a watercraft, comprising:
    a bimini frame including a first frame portion, a second frame portion, and a hinge associating said first frame portion and said second frame portion such that said second frame portion is movable about said hinge between an open configuration and a folded configuration, wherein when said frame is in said open configuration, said first frame portion and said second frame portion are substantially coplanar; and
    a slide piece having an affixing surface positioned and configured for associating said slide piece with said tower structure, said first frame portion being arranged in sliding association with said slide piece such that said bimini frame is movable relative to said slide piece between a non-stowed position and a stowed position, said slide piece including at least one frame association structure configured to receive said first frame portion in both said non-stowed position and said stowed position.

2. The bimini top of claim 1, further including at least one locking device configured to releasably lock said first frame portion against sliding relative to the slide piece.

3. The bimini top of claim 2, wherein said at least one locking device is at least one cam locking device disposed in proximity to said at least one frame association structure.

4. The bimini top of claim 1, wherein said at least one frame association structure is at least two u-shaped hoops affixed to said slide piece.

5. The bimini top of claim 1, wherein at least one of said first frame portion and said second frame portion are configured for attachment of a cover extending across at least one of said first frame portion and said second frame portion.

6. A bimini top system for a watercraft, the system comprising:
    a tower structure extending upwardly from the watercraft;

a stowable frame including a first frame portion, and a second frame portion, and a hinge associating said first frame portion and said second frame portion such that said second frame portion is movable relative to said first frame portion about said hinge between an open configuration and a folded configuration, wherein when said frame is in said open configuration, said first frame portion and said second frame portion are substantially coplanar; and a slide piece affixed to said tower structure and in sliding association with said first frame portion via at least one frame association structure extending from said slide piece;

wherein said sliding association allows said stowable frame to be configured between a non-stowed position extended relatively away from said tower structure and a stowed position disposed in relative proximity to said tower structure via a sliding of the stowable frame relative to said slide piece, wherein said at least one frame association structure is configured to receive said first frame portion in both said non-stowed position and said stowed position.

7. The system of claim 6, further including at least one locking device configured to releasably lock said first frame portion against sliding relative to the slide piece and said tower structure when said stowable frame is in said non-stowed position or said stowed position.

8. The system of claim 7, wherein said at least one locking device is at least one cam locking device disposed in proximity to said at least one frame association structure.

9. The system of claim 6, wherein when said stowable frame is in a non-stowed position said frame is in either an open configuration or a folded configuration.

10. The system of claim 6, wherein said stowable frame is converted from a non-stowed position to a stowed position when said first frame portion and said second frame portion of said stowable frame are in folded configuration.

11. The system of claim 6, wherein said at least one frame association structure is at least two u-shaped hoops affixed to said slide piece.

12. The system of claim 6, wherein at least one of said stowable frame and said tower structure are configured for attachment of a cover extending across at least one of said stowable frame and said tower structure.

* * * * *